G. C. ROSSON AND H. B. PORTER.
EXTENSION STEP CONSTRUCTION FOR CARS.
APPLICATION FILED FEB. 23, 1922.
1,432,624.   Patented Oct. 17, 1922.
3 SHEETS—SHEET 3.
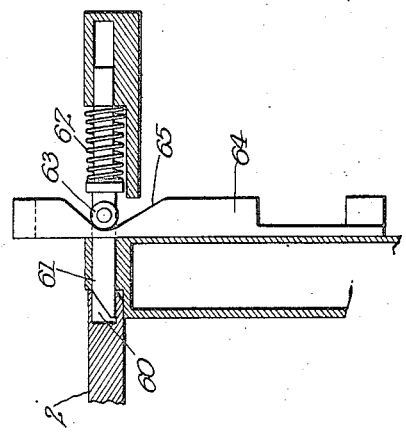
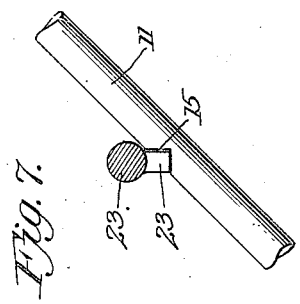
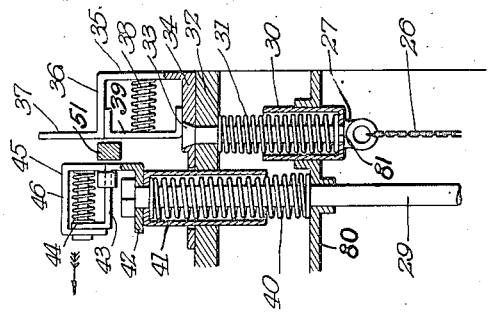
G. C. Rosson
H. B. Porter
INVENTOR
BY
ATTORNEY Patented Oct. 17, 1922.

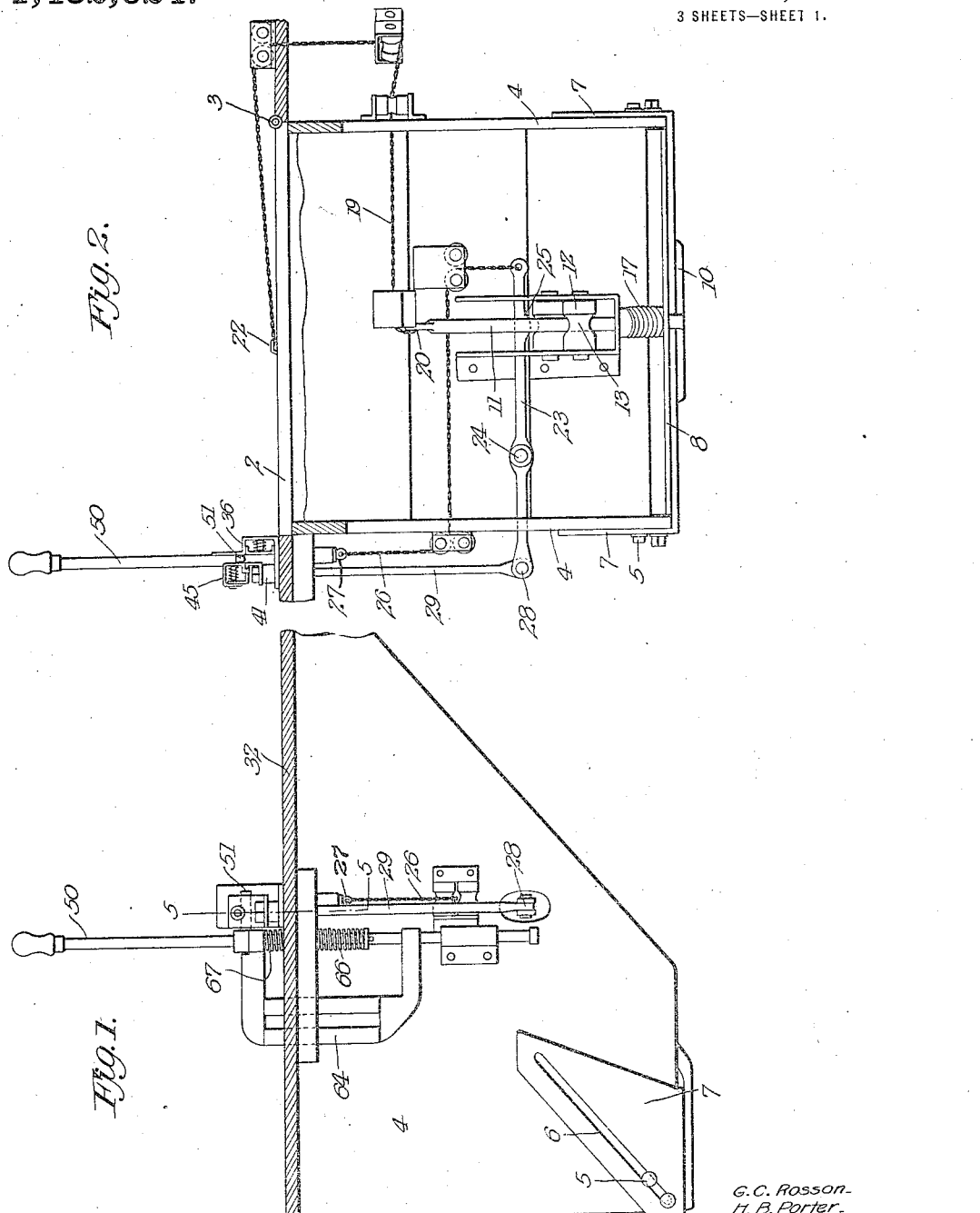

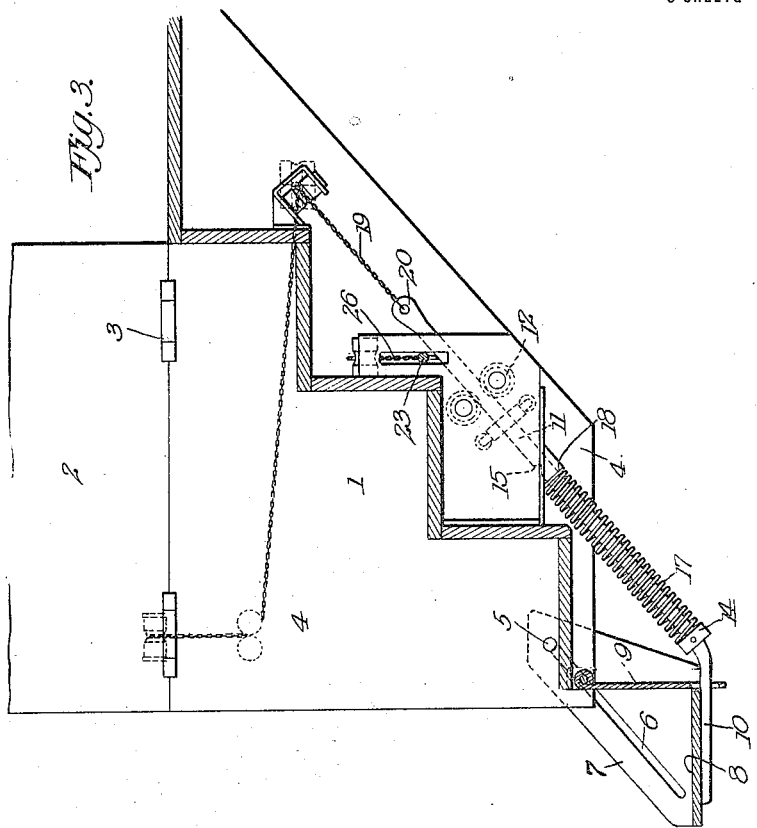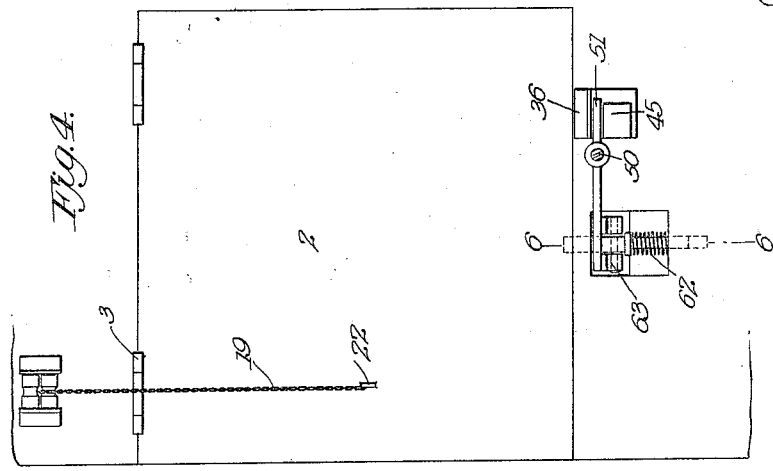

1,432,624

UNITED STATES PATENT OFFICE.

GEORGE C. ROSSON, OF MILFORD, AND HORTON B. PORTER, OF HILLSBORO, TEXAS.

EXTENSION-STEP CONSTRUCTION FOR CARS.

Application filed February 23, 1922. Serial No. 538,554.

*To all whom it may concern:*

Be it known that we, GEORGE C. ROSSON and HORTON B. PORTER, citizens of the United States, residing at Milford and Hillsboro, in the counties of Ellis and Hill, respectively, and State of Texas, have invented new and useful Improvements in Extension-Step Constructions for Cars, of which the following is a specification.

The object of our said invention is the provision of a simple, reliable, easily operated and otherwise practically advantageous extension car step, controlled by the movement of the usual trap door of vestibule cars and adapted when in its extended and working position to obviate the necessity of a trainman placing a box or the like to enable a passenger to conveniently step on or off the usual series of steps.

The invention also makes provision for the opening of a trap door without bringing about movement of the extension step to its working position as is sometimes desirable.

To the attainment of the foregoing, the invention consists in the improvement as hereinafter described and definitely claimed.

In the accompanying drawings, forming part of this specification:—

Figure 1 is a view in side elevation illustrative of our improvement.

Figure 2 is a vertical section taken at the inner side of the organized mechanism shown in Figure 1—i. e., between said mechanism and the interior of the car.

Figure 3 is a vertical section taken at right angles to Figure 2.

Figure 4 is a plan view.

Figure 5 is an enlarged detail section taken in the plane indicated by the line 5—5 of Figure 1, with parts in elevation.

Figure 6 is a section on an enlarged scale taken in the plane indicated by the line 6—6 of Figure 4.

Figure 7 is an enlarged detail section showing the manner in which the latch lever engages the extension step moving rod to hold the said rod against downward and outward movement, the said latch lever being shown in idle position in Figure 3.

Similar numerals of reference designate corresponding parts in all of the views of the drawings.

Our improvement is designed for use in conjunction with the usual steps 1 of a railway car, and the usual trap door 2 above the said steps, the said trap door 2 being hinged at 3 for swinging movement in the ordinary well known manner.

In furtherance of our invention the side walls 4 of the series of steps 1 are provided at their outer sides with headed bolts 5, and the shanks of the said bolts 5 are disposed in inclined slots 6 in side plates 7, Figures 1, 2 and 3 of an extension step 8. The side plates 7 rest at the outer or inner sides of the side walls 4, and it will be noted that the step 8 is movable downwardly and outwardly from the position shown in Figure 1 to the position shown in Figure 3, and is also capable of being retracted from the working position shown in Figure 3 to the idle position shown in Figure 1.

Pivotally mounted between the outer lower portions of the side walls 4 at a point below the lowermost step 1 is a pendent guard 9 which rests in rear of the step 8, and is designed when the step is retracted to be swung inwardly and upwardly so as to be confined between the extension step 8 in its idle position and the underside of the lowermost step 1.

Connected at 10 in appropriate manner to the underside of the extension step 8 is the forward portion of an inclined rod 11 which is extended between and guided by antifriction rollers 12, the said rollers 12 being circumferentially grooved at 13 to better hold the rod 11 against lateral deflection. On the lower portion of the rod 11 is a fixed abutment 14, and it will also be noted that the rod 11 is provided at 15, Figures 3 and 7, with a notch.

At 17 and best shown in Figure 3 is a coiled expansion spring which surrounds the rod 11 and is interposed between the said abutment 14 and an appropriate stationary abutment 18 located above the said abutment 14. The said spring 17 tends to force the extension step 8 downwardly and outwardly, and from this it follows that the retraction of the step 8 must be against the action of the said spring 17.

In order to retract the extension step 8 when the trap door 2 is moved to its closed position, we provide the cable or chain 19 which is connected at 20 to the upper end of the rod 11 and is connected at 22 to the trap door 2. En route between the connection 20 and the connection 22 the cable 19 is guided between pairs of circumferentially grooved rollers and about the rollers as will be clearly understood by comparison of Figures 2 and 3.

For cooperation with the notch 15 of the bar 11 we provide the vertically swinging latch lever 23, fulcrumed at an intermediate point of its length as indicated by 24 and having a portion 25 to co-act with the notch 15 as hereinafter described in detail. The inner end of the said latch lever 23 is connected by a cable or chain 26 with the lower end of a vertically movable member 27. The outer end of the latch lever 23 is pivotally connected at 28 to the lower end of a vertically movable rod 29, Figures 1, 2 and 5. The said vertically movable member 27 is clearly shown in Fig. 5 as movable in and with a cup 30 in which is disposed a coiled spring 31 that surrounds the member 27 and is interposed between the bottom of the cup and the underside of the floor 32. The said spring 31 tends to force the member 27 downwardly so as to leave the latch lever 23 free to engage the rod 11. The member 27 is in the nature of a rod which is loosely extended through the floor 32 and is fixedly connected at its upper end 33 to a vertically movable member which includes a lower horizontal wall 34, an upright wall 35, an upper horizontal wall 36, and a flange 37 extending upwardly from the edge of the wall 36. Manifestly when the member including the walls 34, 35 and 36 is moved upwardly, the member 27 will also be moved upwardly against the action of the spring 31, this in order to lift the inner end of the latch lever 23 and disengage the same from the rod 11 for the release of the said rod 11 as hereinafter described. Backed by a spring 38 and movable laterally in the member including the walls 34, 35 and 36 is a plate 39 which normally closes the said member so as to exclude dust and dirt therefrom. The rod 29 is carried loosely through the floor 32 and is yieldingly pressed upwardly by a spring 40, the upper portion of which is housed in an inverted cup 41 movable vertically through the floor 32. The spring 40 at its lower end bears against a fixed member hereinafter described. Connected to the upper end of the rod 29 is a member 42 which has a horizontal portion 43 from which extends an upstanding portion 44. Appropriately connected to the portions 43 and 44 of the member 42 is a member 45 that is normally held in the relative position shown in Figure 5 by a spring 46, and is movable against the action of the said spring in the direction indicated by arrow in Figure 5.

Extending through the floor 32 and movable vertically and also movable about its axis is a handle rod 50. The said rod 50 is provided with a lateral finger 51, Figures 2, 4 and 5.

Appropriately fixed with respect to the floor 32 and disposed below the same is a guide member 80 which receives the vertically movable rod 29 and affords a bearing for one end of the spring 40. The said member 80 also serves to carry the cup 30 which is slidable in said member 80 so as to afford a housing for the lower portion of the spring 31; it being understood in this connection that the cup 30 is connected at 81 to the member 27.

At 60 the trap door 2 is provided with the recess to receive a door latch 61, Figure 6, which is backed by a spring 62, and is provided with anti-friction rollers 63, Figures 4 and 6. Connected to and movable with the handle rod 50 are vertically movable bars 64, recessed at 65 for cooperation with the anti-friction rollers 63. Manifestly when the rod 50 is moved either upwardly or downwardly against the action of springs 66 and 67, Figure 1 the trap door 2 will be unlatched to permit of the opening thereof. It will be noticed, however, that when the trap door 2 is opened, the rod 11 and the step 8 will not be impelled downwardly and outwardly by the spring 17, this because of the engagement of the latch lever 23 with the notch 15 of the rod 11. It is therefore necessary following the opening of the door 2 to release the rod 11 by disengaging the latch lever 23 therefrom. The said release may be brought about by the operator pressing with his foot downwardly on the member 45 so as to move the rod 29 downwardly and thereby rock the latch lever 23 out of engagement with the notch in the rod 11, or it may be brought about by manipulation of the handle rod 50 in either of two ways. One of the manipulations referred to is to move the handle rod 50 downwardly to disengage the latch 61 from the trap door 2, and then turn the handle rod 50 about its axis to move the finger 51 into the member formed by the walls 34, 35 and 36 and then move the rod 50 upwardly whereupon the said member and the member 27 will be moved upwardly against the action of the spring 31 and thereby pull upwardly on the cable 26 and lift the lever 23 out of engagement with the rod 11. In the other manipulation the handle rod 50 is moved upwardly to unlatch the door 2 and is then swung about its axis to press the member 45, Figure 5, in the direction indicated by arrow, and then with the finger 51 bearing on the member 43, the handle rod 50 is moved downwardly to depress the rod 29 and thereby disengage the lever 23 from the rod 11. Immediately following the disengagement of the lever 23 from the rod 11, the spring 17 will force the rod 11 and the extension step 8 downwardly and outwardly, and will yieldingly maintain the step 8 in its working position. When the trap door 2 is closed, the closing movement thereof will be attended by retraction of the step 8 and the rod 11 until the latch lever 23 engages the notch in the rod 11 when the step will be secured in retracted and idle position. It will also be understood that the extension step 8 can be secured in idle position independently of the trap door 2 by pressing the step 8 and rod 11 inwardly and upwardly by hand or foot until the latch lever 23 engages the notch 15 in the rod 11.

We have entered into a detailed description of the construction and relative arrangement of parts embraced in the present and preferred embodiment of our invention in order to impart a full, clear and exact understanding of the said embodiment. We do not desire, however, to be understood as confining ourselves to the said specific construction and relative arrangement of parts inasmuch as in the future practice of the invention various changes and modifications may be made such as fall within the scope of our invention as defined in our appended claims.

Having described our invention, what we claim and desire to secure by Letters-Patent, is:—

1. The combination of a set of car steps, an extension step connected with the said steps and movable to and from a position below the lowermost of the first-named steps, means to extend the extension step, means to retract the extension step, means to detachably secure the extension step in its retracted position, and a guard back of the extension step and pivotally connected with and pendent from the lowermost of the first-named steps.

2. The combination of a set of car steps, a trap door, an extension step movable to and from a position below the lowermost of the first-named steps, connecting means whereby closing of the trap door will be attended by retraction of the extension step, means controlled by an operative to detachably secure the extension step in its retracted position, and means to impel the extension step to working position on opening of the trap door and release said extension step, and a latch to detachably secure the trap door in closed position; the said operative-controlled means including a connection to disengage the latch from the trap door and also including a latch lever and a connection for the rocking of said latch lever.

3. The combination of a set of car steps, an extension step movable to and from a position below the lowermost step, a trap door, a connection whereby closing of the trap door will be attended by retraction of the extension step, latching means to secure said step in retracted position, a latch to detachably secure the trap door in closed position, and operative-controlled means to disengage the latch from the trap door and to disengage the latching means from the extension step.

4. The combination of a set of car steps, an extension step movable to and from a position below the lowermost step, a trap door, a connection whereby closing of the trap door will be attended by retraction of the extension step, a latch lever to detachably secure the extension step in working position, a vertically movable member connected with one arm of said lever, a spring to yieldingly hold said member against upward movement, a vertically movable member connected with the other arm of the latch lever, a spring to yieldingly hold the latter member against downward movement, a handle rod movable vertically and about its axis and having a finger for cooperation with said vertically movable members alternatively, and means carried by and movable with the handle rod to disengage the latch from the trap door.

5. The combination of a set of car steps, an extension step movable to and from a position below the lowermost step, a trap door, a connection whereby closing of the trap door will be attended by retraction of the extension step, a latch lever to detachably secure the extension step in working position, a vertically movable member connected with one arm of said lever, a spring to yieldingly hold said member against upward movement, a vertically movable member connected with the other arm of the latch lever, a spring to yieldingly hold the latter member against downward movement, a handle rod movable vertically and about its axis and having a finger for cooperation with said vertically movable members alternatively, and means carried by and movable with the handle rod to disengage the latch from the trap door; the first-named vertically movable member having a portion to receive the finger of the handle rod and also having a spring backed guard for said portion, and the second-named vertically movable member being adapted to be depressed by the foot, and being provided with an upper spring-pressed portion movable by the finger of the handle rod to enable said finger to bear downwardly on the lower portion of said member.

6. The combination of a set of car steps, a trap door, an extension step movable to and from a position below the lowermost of the first-named steps, means whereby closing of the trap door will be attended by retraction of the extension step, means to detachably secure the extension step in its retracted position, means to impel the extension step to working position when the trap door is opened and the said extension step is released, a foot device connected with the step-securing means, whereby the step can be released by the foot of an operative, a handle rod, and means connected with the step-securing means and arranged to be engaged and moved by the handle rod.

7. The combination of a set of car steps, a trap door, an extension step movable to and from a position below the lowermost of the first-named steps, means whereby closing of the trap door will be attended by retraction of the extension step, means to detachably secure the extension step in its retracted position, means to impel the extension step to working position when the trap door is opened and the said extension step is released, a foot device connected with the step-securing means, whereby the step can be released by the foot of an operative, a handle rod, and means connected with the step-securing means and arranged to be engaged and moved by the handle rod; the said foot device being also operable by downward movement of the handle rod in one position of the latter.

In testimony whereof we affix our signatures.

GEORGE C. ROSSON.
HORTON B. PORTER.